(12) United States Patent
Endoh et al.

(10) Patent No.: US 7,127,981 B2
(45) Date of Patent: Oct. 31, 2006

(54) SPHERICAL COUPLING STRUCTURE BETWEEN A PISTON AND A CONNECTING ROD

(75) Inventors: Tsuneo Endoh, Wako (JP); Kengo Ishimitsu, Wako (JP); Tsutomu Inoue, Wako (JP); Naomi Warashina, Wako (JP); Keisuke Takaoka, Wako (JP)

(73) Assignee: Honda Motor Co., Ltd, Tokyo (JP)

( * ) Notice: Subject to any disclaimer, the term of this patent is extended or adjusted under 35 U.S.C. 154(b) by 96 days.

(21) Appl. No.: 10/980,650

(22) Filed: Nov. 4, 2004

(65) Prior Publication Data

US 2005/0098141 A1 May 12, 2005

(30) Foreign Application Priority Data

Nov. 7, 2003 (JP) ............................. 2003-378002
Nov. 11, 2003 (JP) ............................. 2003-381416

(51) Int. Cl.
*F16J 1/22* (2006.01)
*F02F 3/00* (2006.01)

(52) U.S. Cl. .................................. 92/165 PR; 92/187

(58) Field of Classification Search ............ 92/165 PR, 92/187

See application file for complete search history.

(56) References Cited

U.S. PATENT DOCUMENTS 1,294,538 A * 2/1919 Rose ............................ 92/187

FOREIGN PATENT DOCUMENTS

| JP | 3-17369 U | | 2/1991 |
|---|---|---|---|
| JP | 9-144879 A | | 6/1997 |
| JP | 09144879 A | * | 6/1997 |
| JP | 2000-213646 A | | 8/2000 |
| JP | 2000-337506 A | | 12/2000 |

* cited by examiner

*Primary Examiner*—Thomas E. Lazo
(74) *Attorney, Agent, or Firm*—Birch, Stewart, Kolasch & Birch, LLP

(57) ABSTRACT

A coupling structure for coupling a piston and a connecting rod has a protrusion formed on the rear surface of the crown of the piston and having a semi-spherical concavity and a threaded portion concentric to the concavity, a substantially spherical small end formed at one end of the connecting rod, a holder holding the spherical small end of the connecting rod slidably in the semi-spherical concavity of the protrusion and a fixing ring having a threaded portion engaging with the threaded portion of the protrusion for securing the holder to the protrusion of the piston.

10 Claims, 18 Drawing Sheets

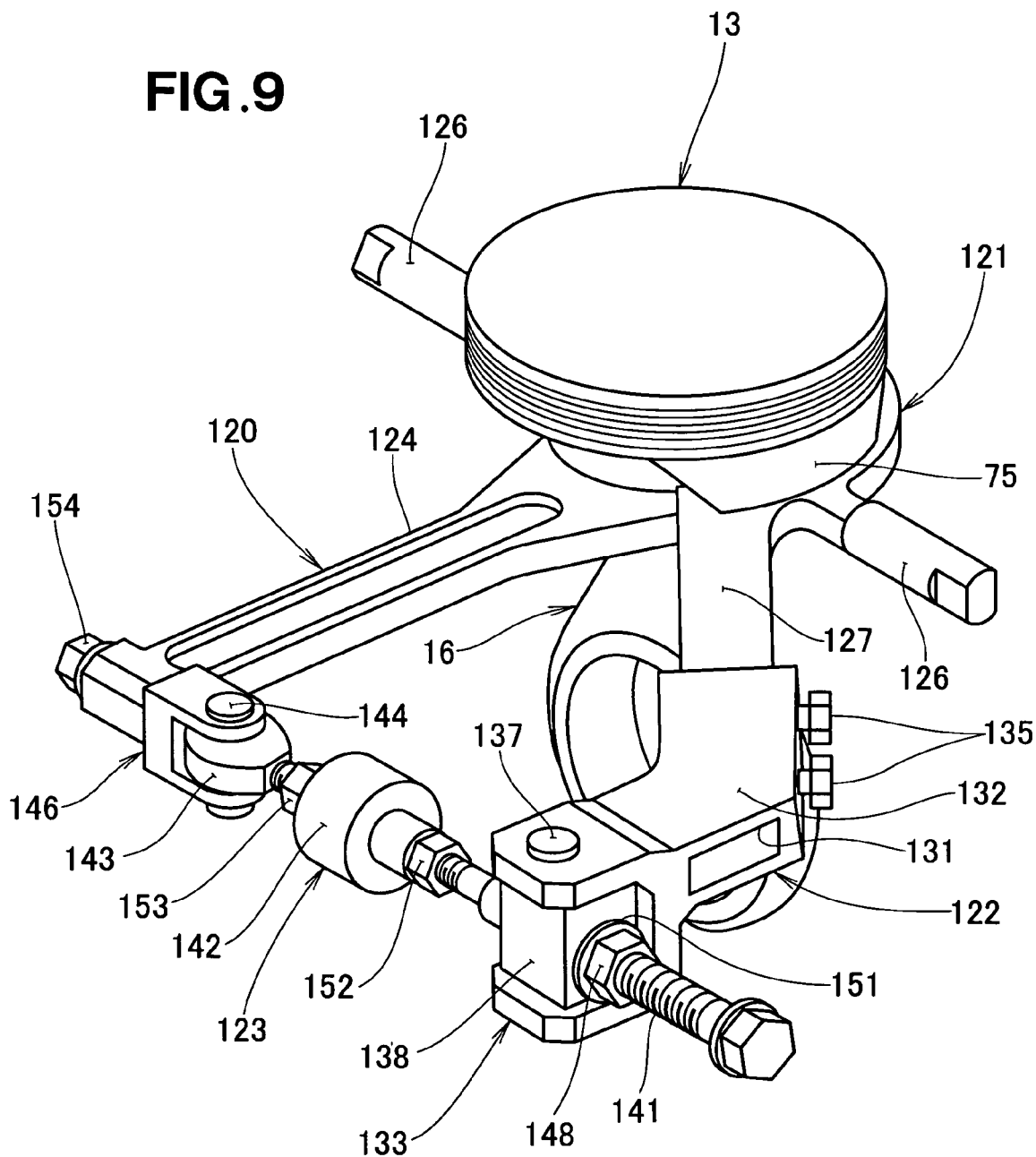

SPHERICAL COUPLING STRUCTURE BETWEEN A PISTON AND A CONNECTING ROD

FIELD OF THE INVENTION

This invention relates to an improvement in the spherical coupling structure between a piston and a connecting rod.

BACKGROUND OF THE INVENTION

There is known a coupling structure between a piston and a connecting rod using a spherical joint as disclosed in, for example, JP-UM-A-3-17369, JP-A-9-144879, JP-A-2000-337506 and JP-A-2000-213646.

The coupling structure disclosed in JP-UM-A-3-17369 has a semi-spherical concavity 201 formed in the rear surface of the crown of a piston 200, a small end 203 formed on a connecting rod 202 in a substantially spherical shape conforming to the shape of the concavity 201 and two split flanges 204 screwed to the crown surface extending around the concavity 201 of the piston 200 for holding against the piston 200 the small end 203 of the connecting rod 202 fitted slidably in the concavity 201, as shown in FIG. 17.

The coupling structure as described requires for securing the flanges 204 to the piston 200 six screws 206 which add to the number of parts for the structure, its cost and its weight correspondingly. As the number of the screws 206 which are used is large, a correspondingly large amount of time and labor is required for coupling the piston to the connecting rod and thereby brings about a lowering of productivity.

FIG. 18 shows the spherical coupling structure between a piston and a connecting rod as disclosed in JP-A-9-144879. The coupling structure includes a concave spherical washer 212 fitted in a concavity formed in the rear surface of the crown 211 of a piston 210, though not designated, a small end 216 formed on a connecting rod 214 in a spherical shape conforming to a concave spherical surface 213 formed in the concave spherical washer 212, a holder 217 for holding the small end 216 slidably in the concave spherical washer 212, a rotation-preventing member 218 held on the holder 217 and a plurality of pairs of bolts 221 and nuts 222 for securing the concave spherical washer 212, holder 217 and rotation-preventing member 218 together to the piston 210.

The coupling structure as described includes the concave spherical washer 212, holder 217, rotation-preventing member 218 and pairs of bolts 221 and nuts 222 which increase the number of parts for the structure and its weight. The concave spherical washer 212 is, among others, responsible for the increased weight, since it is made of an iron-based material. The increased number of parts as stated requires an increased amount of time and labor for coupling the piston to the connecting rod and thereby brings about a lowering of productivity, as in the case of the coupling structure disclosed in JP-UM-A-3-17369 (FIG. 17).

The coupling structure disclosed in JP-A-2000-337506 includes a small end 235 formed on a connecting rod 234 in a substantially cross shape having a spherical surface, as shown in FIG. 19A. The substantially cross-shaped small end 235 has a first protrusion 236 and a second protrusion 237 crossing each other at right angles, the second protrusion 237 being smaller in diameter than the first protrusion 236. A piston 230 has a concavity 241 (FIG. 19B) formed in the rear surface of a crown 231 and having a spherical inner wall surface. The concavity 241 has at its open end a cross-shaped opening 242 conforming to the shape of the small end 235 of the connecting rod 234. For assembly, the protrusion 237 of the connecting rod 234 is inserted into the concavity 241 of the piston 230 through its cross-shaped opening 242 and turned by 90 degrees, whereby the piston 230 and the connecting rod 234 are coupled together.

The coupling structure as described makes it possible to reduce the number of parts and the amount of time and labor as required for assembly, since it does not require any of the screws, bolts or other fasteners as shown in FIGS. 17 and 18. However, the opening 242 of the concavity 241 of the piston 230 and the small end 235 of the connecting rod 234, which are both cross-shaped, require a complicated machining job and need to be improved from the standpoints of productivity and production cost. The cross-shaped small end 235 of the connecting rod 234 has a relatively small area of contact with the wall of the concavity 241 of the piston 230, which increases the pressure acting upon the joint and thereby lowers its coupling strength.

FIG. 20 shows the spherical coupling structure between a piston and a connecting rod as disclosed in JP-A-2000-213646. The coupling structure has a semi-spherical concavity 251 formed in the rear surface of the crown of a piston 250, a fixing plate 252 secured to the rear surface of the crown of the piston 250 and a spherical small end 256 of a connecting rod 254 held slidably in a spherical space defined by the concavity 251 of the piston 250 and a spherical inner surface 253 of the fixing plate 252. The small end 256 of the connecting rod 254 has its center C (i.e. the center of the joint between the piston 250 and the connecting rod 254) offset radially of the piston 250 by an amount δ of eccentricity from its axial centerline CL.

The offsetting of the center C of the joint between the piston 250 and the connecting rod 254 by δ from the axial centerline of the piston 250 prevents the piston 250 from rotating about the center C of its joint with the connecting rod 254 by causing the piston 250 to contact the wall surface of a cylinder. When the piston 250 and the cylinder has a large clearance therebetween during, for example, the beginning of engine operation when the piston 250 is still at a low temperature, however, the piston 250 rotates about the connecting rod 254 and if the piston 250 contacts the cylinder in any portion of high rigidity other than its skirts, the piston 250 gives the cylinder a large striking force which is likely to deprive the clearance between the piston 250 and the cylinder of a lubricant oil film. It is, therefore, desirable to be able to prevent the rotation of the piston 250 about the connecting rod 254 irrespective of the stage of engine operation. It is also desirable to prevent the rotation of the piston 250 without incurring any additional cost.

Therefore, it is desirable to provide a spherical coupling structure between a piston and a connecting rod which requires only a small number of parts, is thus inexpensive and small in weight and thereby improves productivity, and which makes it possible to prevent the rotation of the piston about the connecting rod irrespective of the stage of operation of an internal combustion engine and without incurring any additional cost.

SUMMARY OF THE INVENTION

According to this invention, there is provided a coupling structure for coupling a piston and a connecting rod, including a protrusion formed on the rear surface of the crown of the piston and having a semi-spherical concavity and a threaded portion concentric to the concavity, a substantially spherical small end formed at one end of the connecting rod, a holder having a spherical inner surface and holding the substantially spherical small end of the connecting rod slidably in a substantially spherical space defined by its inner surface and the semi-spherical concavity of the protrusion and a fixing ring having a threaded portion engaging with the threaded portion of the protrusion for securing the holder to the protrusion of the piston.

The coupling structure for a piston and a connecting rod as set forth above relies upon only the engagement of a pair of threaded portions for coupling a piston and a connecting rod easily and reliably, and requires a fewer parts and is thus less expensive and smaller in weight than any known structure employing a plurality of bolts. The fewer parts make it possible to facilitate the coupling of the connecting rod to the piston and thereby improve the productivity of the engine and cut down its cost of manufacture.

According to an aspect of this invention, the threaded portion of the protrusion is defined by a cylindrical inner surface thereof extending from the open edge of the semi-spherical concavity and having a female thread, while the threaded portion of the fixing ring is defined by a cylindrical outer surface thereof and having a male thread. The threaded joint formed by the female and male threads has so short a distance from the area where the fixing member holds the supporting member in position, that the fixing member has only a small bending stress.

According to another aspect of this invention, the threaded portion of the protrusion is defined by a cylindrical outer surface thereof having a male thread, while the threaded portion of the fixing ring is defined by a cylindrical inner surface thereof having a female thread. The fixing ring may have an engaging recess formed in its outer surface for engaging a part of a jig for turning the ring.

The coupling structure for a piston and a connecting rod according to this invention may further include a sliding surface formed near the base of the spherical small end of the connecting rod in parallel to the swinging direction of the connecting rod and a guide surface formed on the holder in sliding contact with the sliding surface of the connecting rod for guiding its swinging motion, the sliding and guide surfaces defining a device for preventing the rotation of the piston about the connecting rod and thereby the longitudinal axis of a cylinder.

According to the spherical coupling structure for a piston and a connecting rod as described above, the guiding of the sliding surface of the connecting rod by the guide surface of the holder ensures that the rotation of the piston be prevented irrespective of the stage of operation of an internal combustion engine, as during the beginning of its operation when the piston and cylinder are still at a low temperature. As the sliding surface of the connecting rod and the guide surface of the holder prevent the rotation of the piston, no additional device is required for that purpose, but the structure according to this invention has only a few parts and is, therefore, inexpensive.

BRIEF DESCRIPTION OF THE DRAWINGS

Certain preferred embodiments of the present invention will be described in detail below, by way of example only, with reference to the accompanying drawings, in which:

FIG. 9 is a perspective view showing a jig for tightening the fixing ring according to this invention;

DETAILED DESCRIPTION OF THE INVENTION

Figure 1:
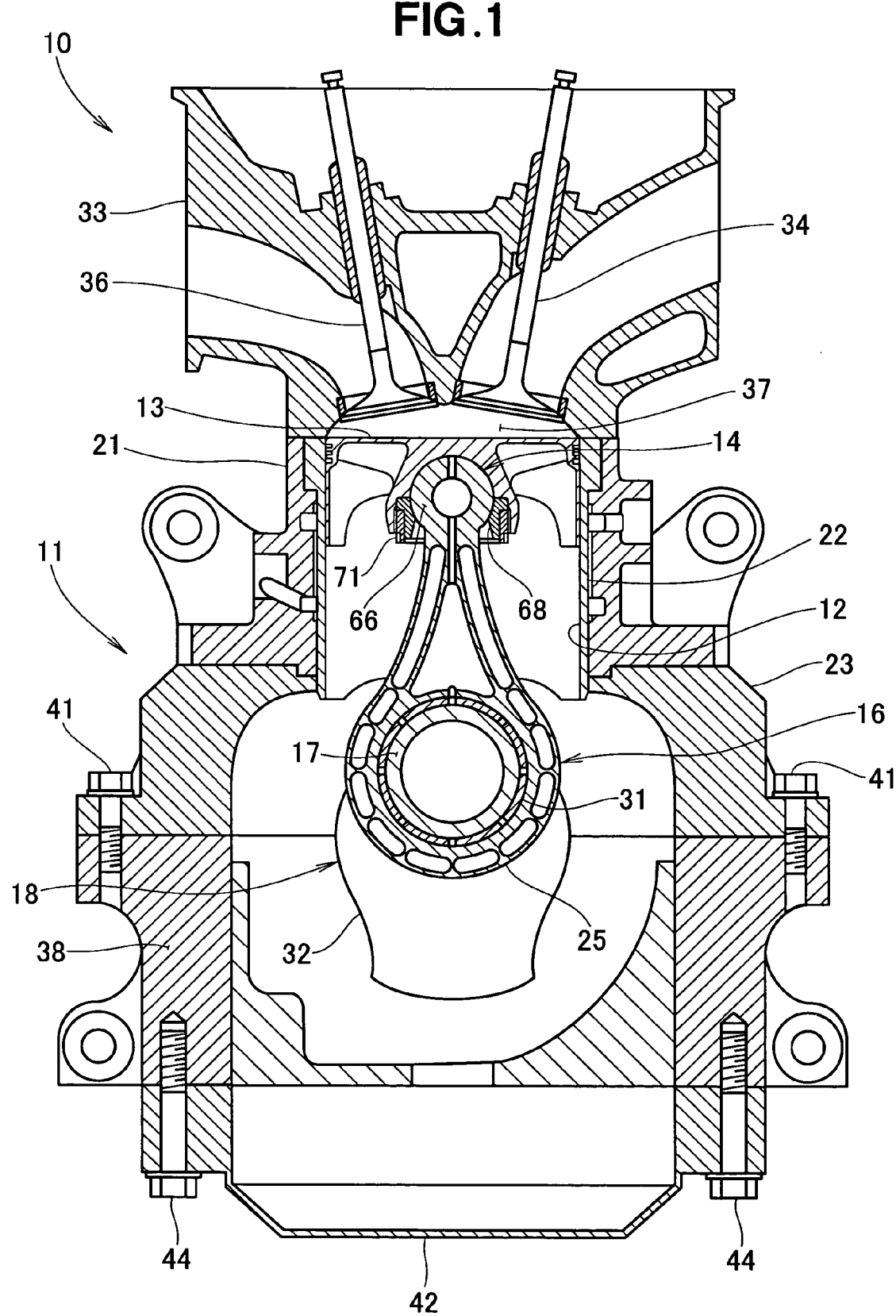
FIG. 1 is a longitudinal sectional view of an internal combustion engine including a piston and a connecting rod having a coupling structure according to this invention.

Referring first to FIG. 1, an internal combustion engine 10 has a cylinder block 11, a piston 13 fitted movably in a cylinder bore 12 formed in the cylinder block 11, a connecting rod 16 coupled to the piston 13 by a spherical joint 14, and a crankshaft 18 attached rotatably to a lower portion of the cylinder block 11 and supporting the connecting rod 16 swingably by a hollow crank pin 17.

The cylinder block 11 has a cylinder 21 formed in its upper portion, a cylindrical sleeve 22 fitted in the cylinder 21 and defining the cylinder bore 12 and an upper crankcase 23 attached to the bottom of the cylinder 21.

Reference numeral 31 denotes a sliding bearing disposed between the big end 25 of the connecting rod 16 and the crank pin 17; 32, a counterweight on the crankshaft 18; 33, a cylinder head attached to the top of the cylinder block 11 with a head gasket disposed therebetween, but not shown; 34, an intake valve; 36, an exhaust valve; 37, a combustion chamber; 38, a lower crankcase secured to the bottom of the upper crankcase 23 by bolts 41 and forming a crankcase therewith; and 42, an oil pan secured to the bottom of the lower crankcase 38 by bolts 44.

Figure 2:
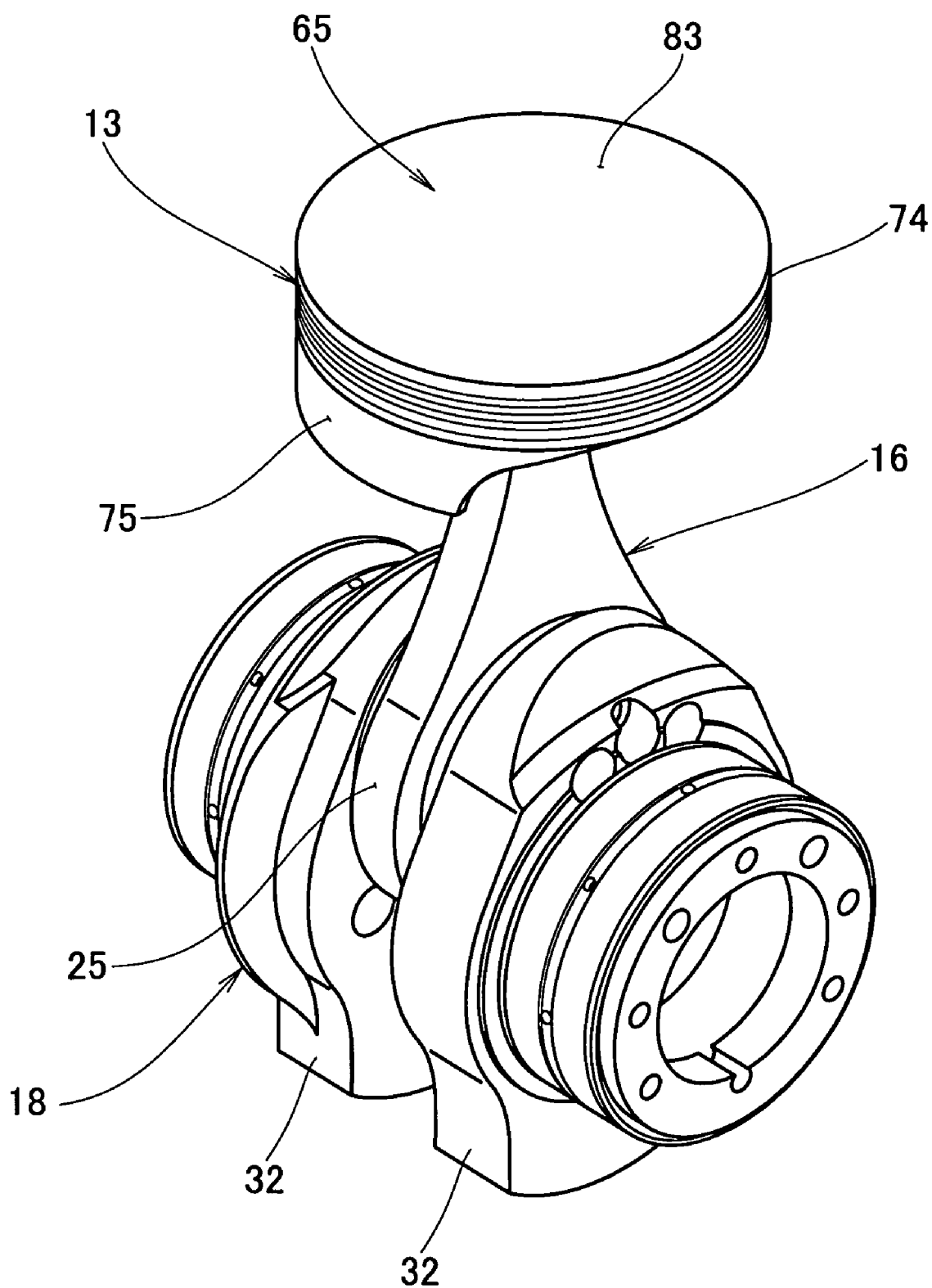
FIG. 2 is a perspective view of the piston, connecting rod and a crankshaft as put together.

The connecting rod 16 is coupled swingably to the piston 13 at one end and to the crankshaft 18 at the other end, as shown in FIG. 2. The piston 13 may, for example, be obtained by casting a material designated as AC8A [JIS H 5202], subjecting its casting to T6 heat treatment and machine finishing it. The connecting rod 16 is preferably formed from chromium or chromium-molybdenum steel, or a titanium alloy.

Figure 3:
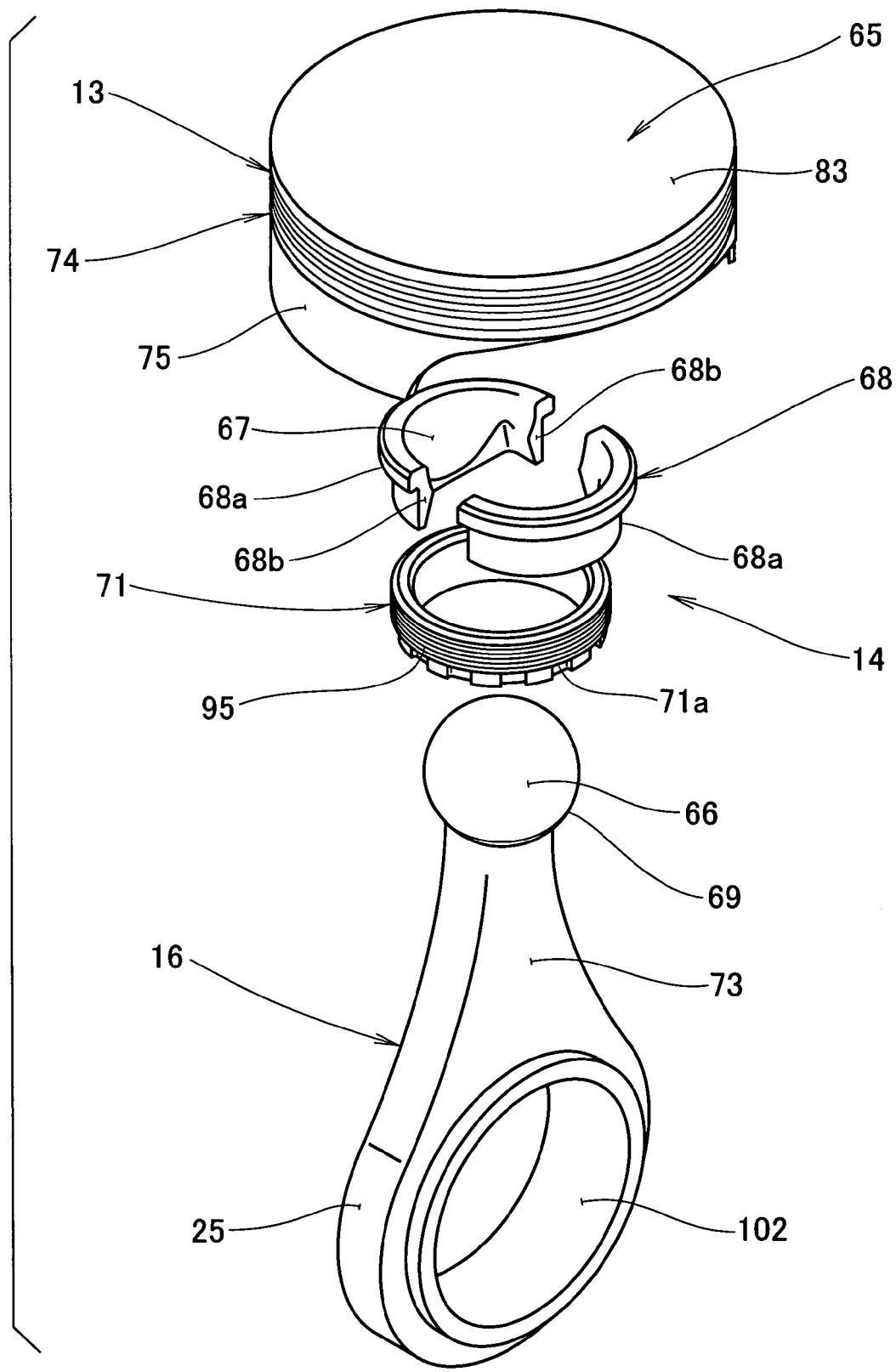
FIG. 3 is an exploded perspective view of the coupling structure for the piston and connecting rod according to this invention.

FIG. 3 is an exploded perspective view showing the coupling structure for the piston and connecting rod according to this invention. The coupling structure has a protrusion formed on the rear surface of the crown 65 of a piston 13 and having a semi-spherical concavity (as will be described in detail later), a spherical small end 66 formed on one end of a connecting rod 16, a split holder 68 having a spherical inner surface 67 for supporting a lower portion of the small end 66 and a threaded fixing ring for securing the holder 68 to the rear surface of the crown 65 of the piston 13, as shown in FIG. 3. In FIG. 3, reference numeral 69 denotes the spherical surface of the small end 66. The connecting rod 16 is formed by the small end 66, an annular big end 25 and a rod body 73 to which the small and big ends 66 and 25 are joined integrally. The holder 68 is formed by two holder halves 68a. 68b denotes the mating surfaces where the two holder halves 68a are mated.

Figure 4:
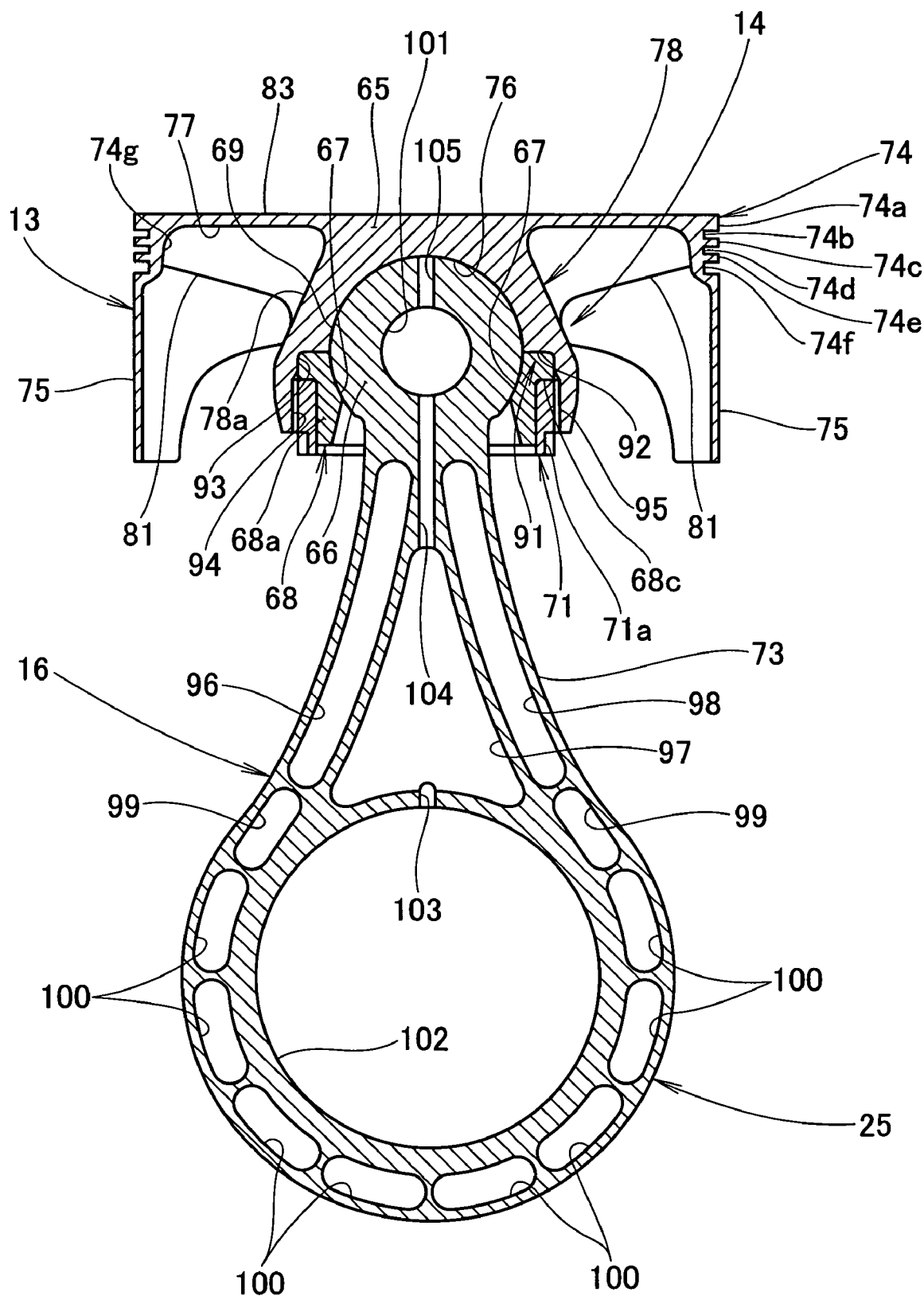
FIG. 4 is a longitudinal sectional view of the piston and connecting rod having the coupling structure according to this invention.

The piston 13 is a one-piece structure and has the crown 65 shaped like a disk, a tubular land 74 extending downward from the edge of the crown 65 and having a large wall thickness, tubular skirts 75 extending downward from the land 74 and having a smaller thickness than that of the land 74, a cup-shaped support (protrusion) 78 protruding from the rear surface 77 of the crown 65 to form a semi-spherical concavity 76 in which the small end 66 of the connecting rod 16 is slidably fitted and a plurality of ribs 81 extending radially between the land 74 and the cup-shaped support 78 and downward from the rear surface 77 of the crown 65, as shown in FIG. 4. The crown 65 has a crown surface 83 defining a part of the combustion chamber 37 (see FIG. 1).

The land 74 has a top land 74a, a top ring groove 74b, a second land 74c, a second ring groove 74d, a third land 74e and an oil ring groove 74f formed on its outer peripheral surface in the order mentioned as viewed from the crown surface 83 to the skirts 25, and a top ring, a second ring and an oil ring which are not shown are fitted in the grooves 74b, 74d and 74f, respectively.

The cup-shaped support 78 has a downwardly opening concavity 91, the semi-spherical concavity 76 formed in the bottom 92 of the concavity 91 and a female thread 94 formed in the cylindrical inner surface 93 of the concavity 91. The connecting rod 16 is swingably coupled to the piston 13 by having its spherical small end 66 held against the wall of the semi-spherical concavity 76, placing the holder 68 in the downwardly opening concavity 91 to have the small end 66 of the connecting rod 16 held on the spherical inner surfaces 67 of the holder 68 and engaging a male thread 95 formed on cylindrical outer surface 111 (FIG. 6) of the fixing ring 71 with the female thread 94 formed on the cylindrical inner surface 93 of the cup-shaped support 78 to secure the fixing ring 71 to the cup-shaped support (protrusion) 78. The cylindrical outer surface 111 of the fixing ring 71 having the male thread 95 defines a threaded portion of the fixing ring 71 and the cylindrical inner surface 93 of the cup-shaped support (protrusion) 78 having the female thread 94 defines a threaded portion of the cup-shaped support (protrusion) 78. The threaded portions 111 and 93 are concentric to the semi-spherical concavity 76.

The cup-shaped support 78 having the semi-spherical concavity 76 and the threaded portion 93, the spherical small end 66, the holder 68 having the spherical inner surface 67 and the threaded fixing ring 71 form the spherical joint 14.

The holder 68 is held against rotation about the cup-shaped support 78 by a stop pin not shown, and has a rotation preventing surface not shown, but abutting on the rod body 73 to hold the piston 13 against rotation about the connecting rod 16. Each holder half 68a has a shoulder 68c around its outer surface and the fixing ring 71 has its end (upper end in FIG. 4) held against the shoulder 68c to fix the holder half 68a to the cup-shaped support 78.

The fixing ring 71 has around its outer peripheral surface the male thread 95 and a plurality of engaging recesses 71a in which a tool is engageable to turn the fixing ring 71.

The connecting rod 16 has hollows 96 to 100 in its big end 25 and rod body 73 and a hollow 101 in its small end 66 to have its weight reduced and also has oil holes 103 to 105 through which oil can be supplied from a mounting hole 102 formed in its big end 25 to the sliding surfaces of the spherical joint 14.

Figure 5:
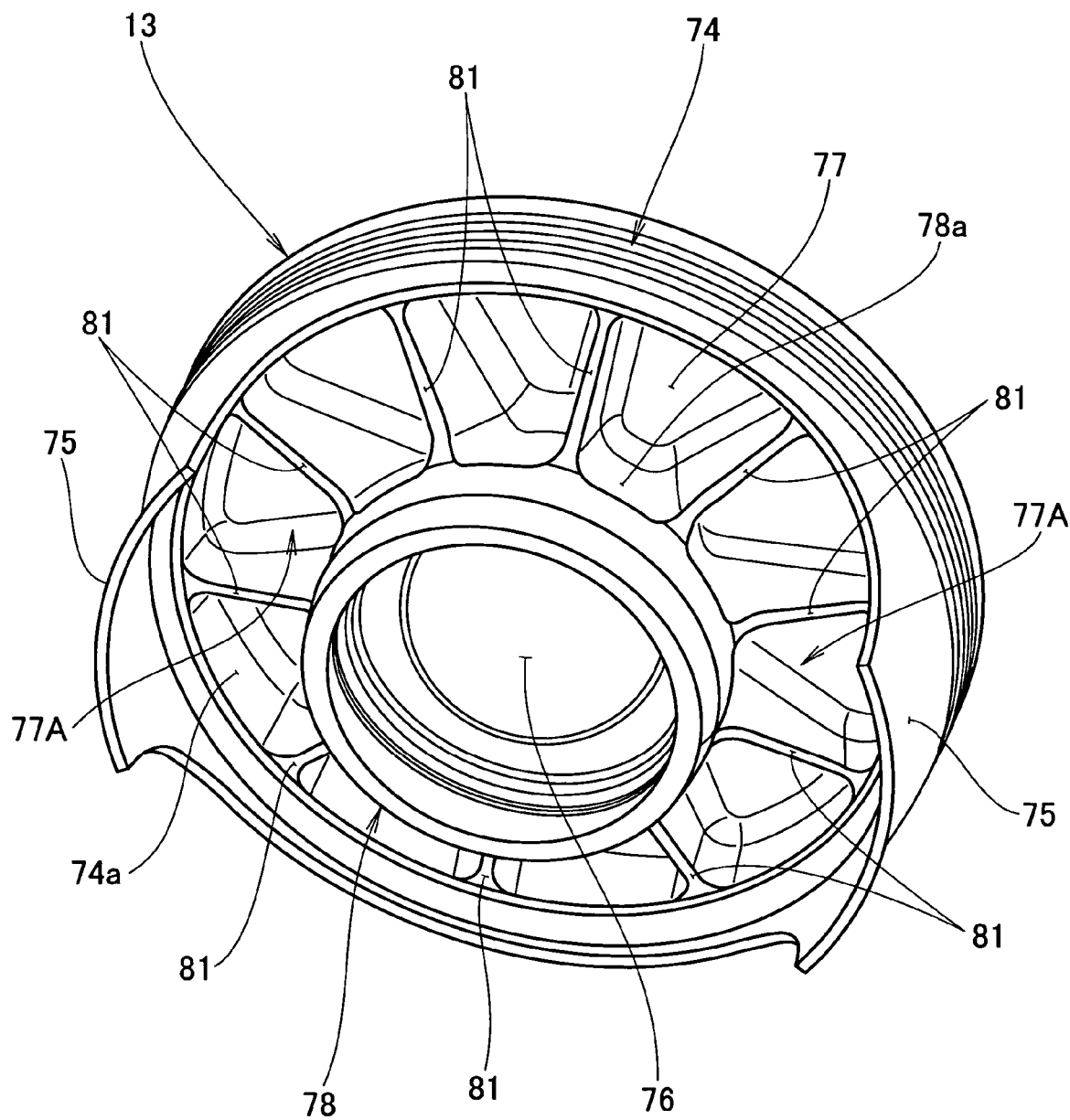
FIG. 5 is a perspective view of the piston showing its rear surface.

The ribs 81 are formed on the rear surface 77 of the crown 65 (see FIG. 4) of the piston 13 for connecting the land 74 and the cup-shaped support 78, as shown in FIG. 5. Reference numeral 77A denotes a jib holding recess defined by the rear surface 77, every two adjoining ribs 81, the inner surface 74a of the land 74 and the outer surface 78a of the cup-shaped support 78 for holding a jig (which will be described later) when coupling the piston 13 and the connecting rod 16.

The ribs 81 provide a rigid connection between the land 74 and the cup-shaped support 78 and thereby raise the rigidity of the upper portion of the piston 13. The individual ribs 81 may be small enough in thickness to suppress any undesirable increase in weight that they would otherwise give to the piston.

Figure 6:
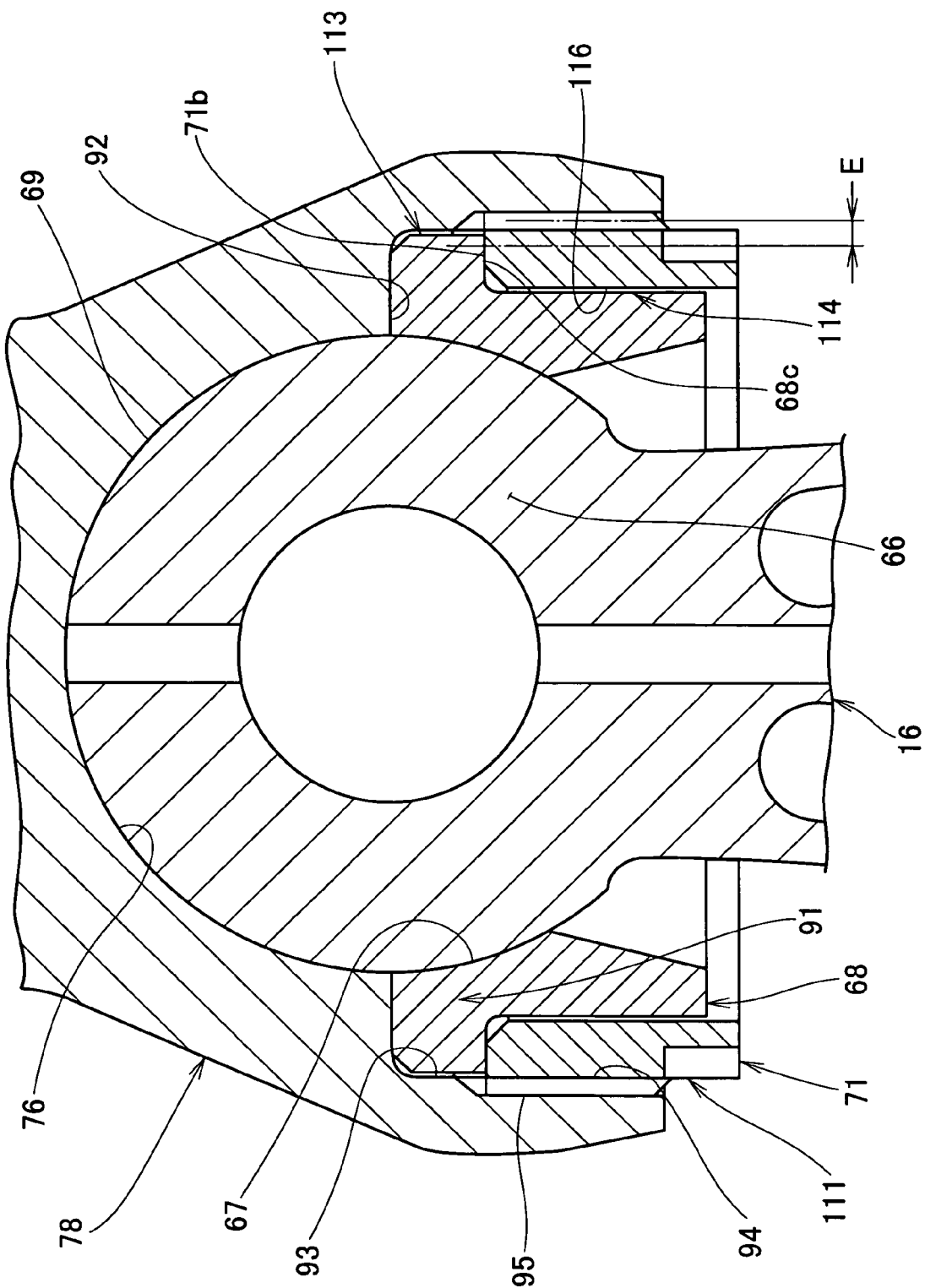
FIG. 6 is an enlarged sectional view of the joint for the piston and connecting rod according to this invention.

Referring to FIG. 6, it is noted that the holder 68 is fixed to the cup-shaped support 78 when the female thread 94 formed on the inner surface 93 of the downwardly opening concavity 91 of the cup-shaped support 78 and the made thread 95 formed on the outer surface 111 of the fixing ring 71 are engaged with each other after the holder 68 is inserted into the concavity 91 to hold the small end 66 of the connecting rod 16.

Clearances 113 and 114 are formed between the inner surface 93 of the cup-shaped support 78 and the outer surface of the holder 68 and between the inner surface 116 of the fixing ring 71 and the outer surface of the holder 68, respectively, so that the holder 68 may contact only the bottom 92 of the downward concavity 91 and the spherical surface 69 of the small end 66 and hold the spherical surface 69 of the small end 66 accurately on the spherical inner surface defined by the semi-spherical concavity 76 and the spherical surfaces 67 irrespective of, for example, the machining accuracy of the inner peripheral surface 93 of the downward concavity 91 or the inner surface 116 of the fixing ring 71.

A method of coupling the piston 13 and the connecting rod 16 will now be described with reference to FIGS. 7A, 7B, 8A and 8B.

Figure 7A:
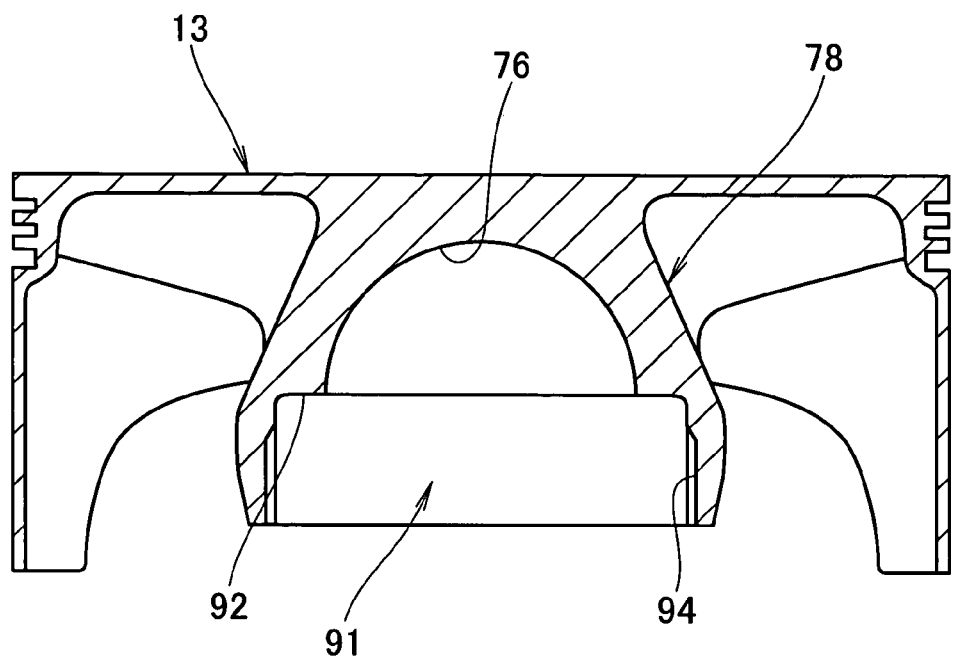
FIGS. 7A and 7B are sectional views showing the step of fitting the spherical small end of the connecting rod in the semi-spherical concavity of the piston to constitute the coupling of the piston and connecting rod according to this invention.
Figure 7B:
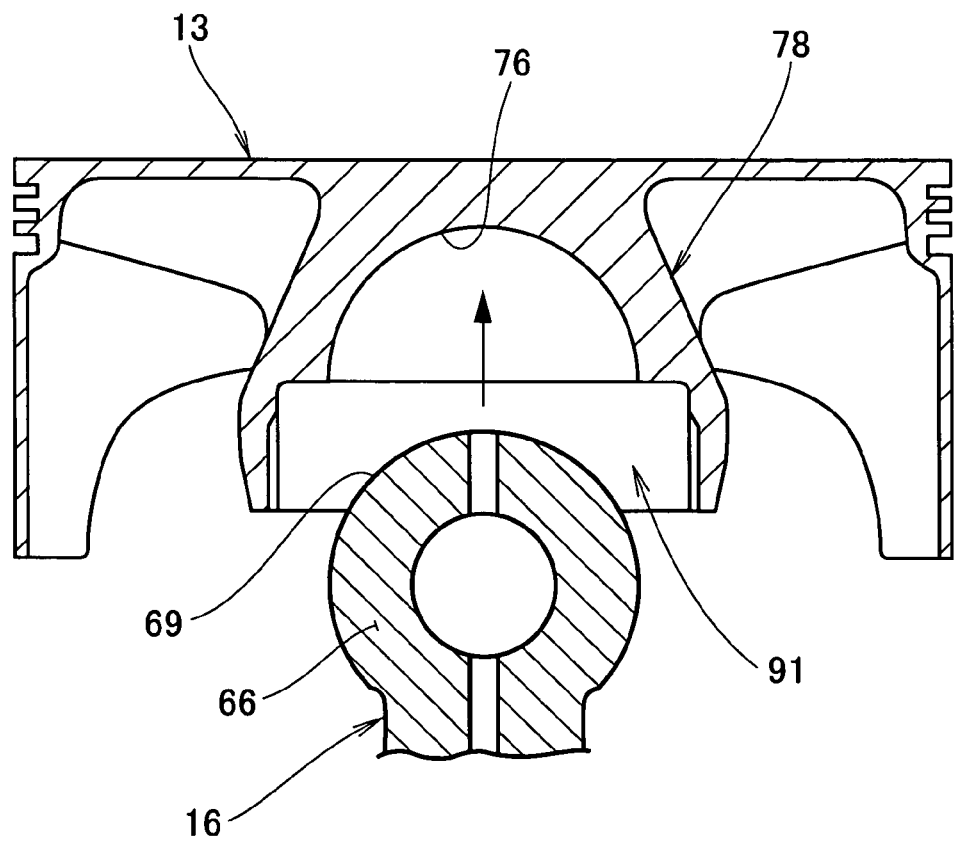

The spherical small end 66 of the connecting rod 16 is inserted into the downwardly opening concavity 91 and semi-spherical concavity 76 of the cup-shaped support 78, as shown in FIGS. 7A and 7B.

Figure 8A:
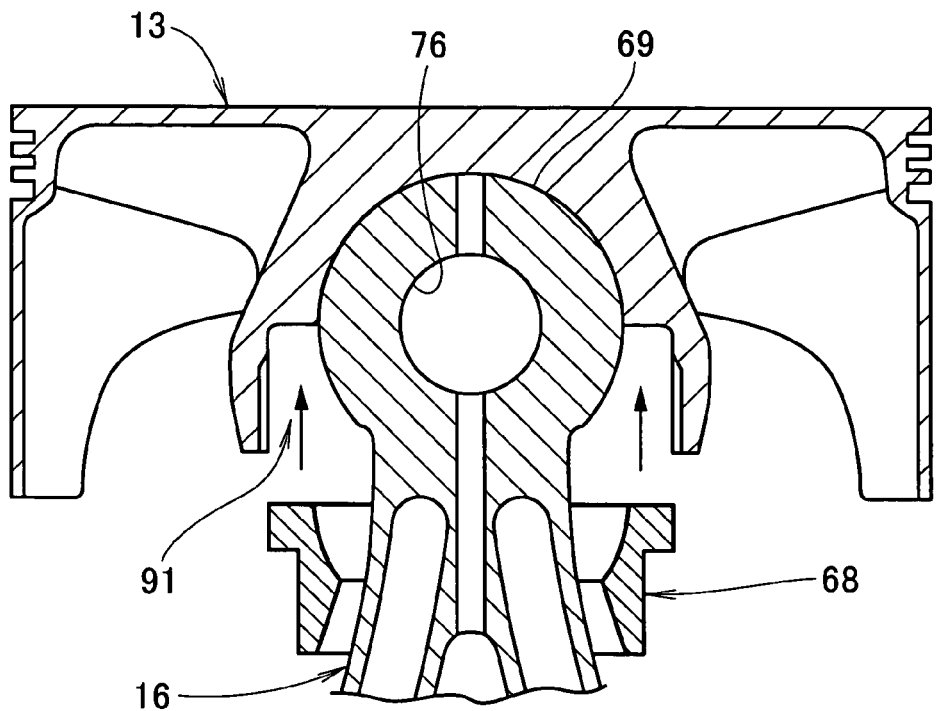
FIGS. 8A and 8B are sectional views showing the step of having the small end of the connecting rod held by a holder and securing the holder to the piston by a fixing ring.

After the spherical surface 69 of the connecting rod 16 is fitted in the semi-spherical concavity 76, the split holder 68 is inserted into the downward concavity 91 as shown by arrows in FIG. 8A.

Figure 8B:
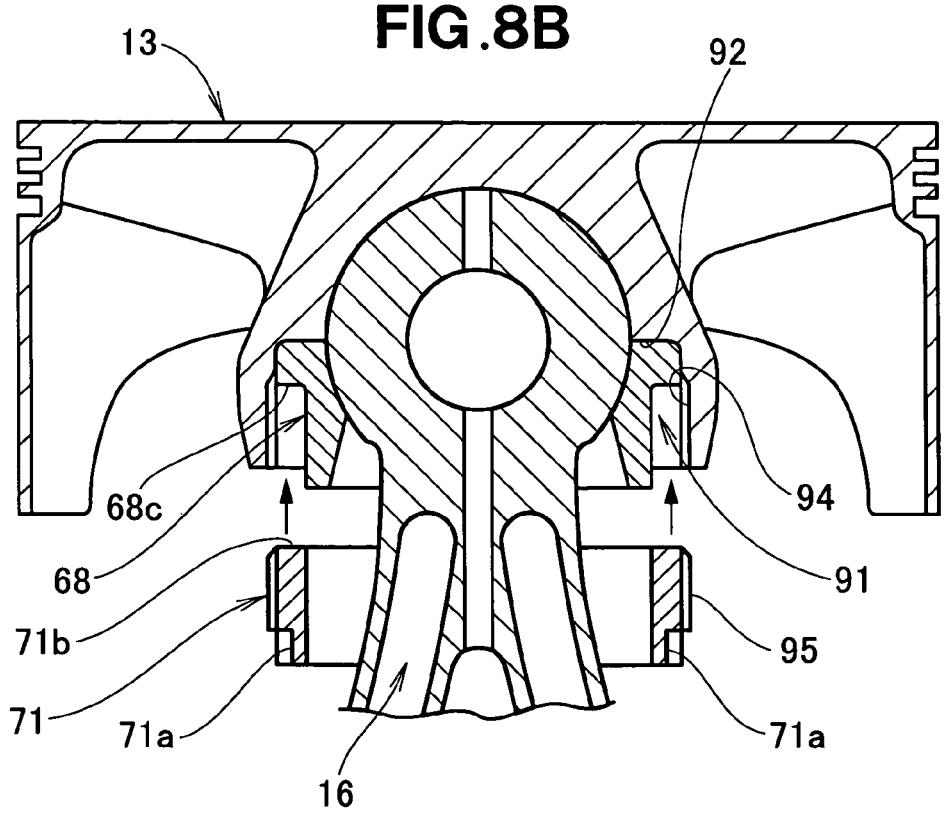

Then, the holder 68 is brought into contact with the bottom 92 of the downward concavity 91, the male thread 95 of the fixing ring 71 is engaged with the female thread 94 of the cup-shaped support 78 and the end 71b of the fixing ring 71 is pressed against the shoulder 68c of the holder 68, as shown in FIG. 8B. A tool is engaged in the engaging recesses 71a of the fixing ring 71 to turn the fixing ring 71 and thereby secure the holder 68 to the cup-shaped support 78. Thus, the coupling of the piston 13 and the connecting rod 16 is finished.

Referring to FIG. 9, a tightening jig 120 includes a piston holding portion 121 for holding the piston 13 in position, a supporting portion 122 supporting the piston holding portion 121 slidably, a tightening force generating portion 123 having one end connected with the supporting portion 122 for generating a tightening force for tightening the fixing ring 71 (see FIG. 4) and an arm-shaped wrench portion 124 connected to another end of the tightening force generating portion 123 and engaged about the fixing ring 71.

The piston holding portion 121 has a plurality of projections (FIG. 10) fitted in the jig holding recesses 77A formed on the rear surface 77 of the piston 13 as described with reference to FIG. 5 to hold the piston 13 against rotation, as shown in FIG. 9.

The piston holding portion 121 also has a pair of handles 126 for securing the piston 13 and the tightening jig 120 together. The piston holding portion 121 is connected to the supporting portion 122 by a straight portion 127.

The supporting portion 122 has a guide portion 132 having a rectangular bore 131 into which the straight portion 127 extends, and a U-shaped portion 133 formed integrally with the guide portion 132. The straight portion 127 is secured to the guide portion 132 by bolts 135.

The tightening force generating portion 123 includes a block 138 attached to the U-shaped portion 133 rotatably by a first pin 137, a first bolt 141 extending through the block 138, a load cell 142 connected threadedly with the end of the first bolt 141, a connecting member 143 connected threadedly with the load cell 142 and an end member 146 connected to the connecting member 143 by a second pin 144, while the wrench portion 124 has its end attached to the end member 146.

The load cell 142 is a sensor for detecting the tightening force for the fixing ring 71 and controls the tightened state of the fixing ring 71 by a tightening torque calculated by multiplying the detected tightening force by the arm length of the wrench portion 124. The piston holding portion 121 is slidable by the supporting portion 122 so that the tightening force generating portion 123 and the wrench portion 124 may lie at right angles to each other to permit an accurate calculation of the tightening torque.

Reference numeral 148 denotes an adjust nut which can be turned about the first bolt 141 to adjust its axial position, 151 denotes a washer, 152 denotes a first lock nut for holding the load cell 142 against rotation, 153 denotes a second lock nut for holding the connecting member 143 against rotation and 154 denotes a second bolt for attaching the end of the wrench portion 124 to the end member 146.

Figure 10:
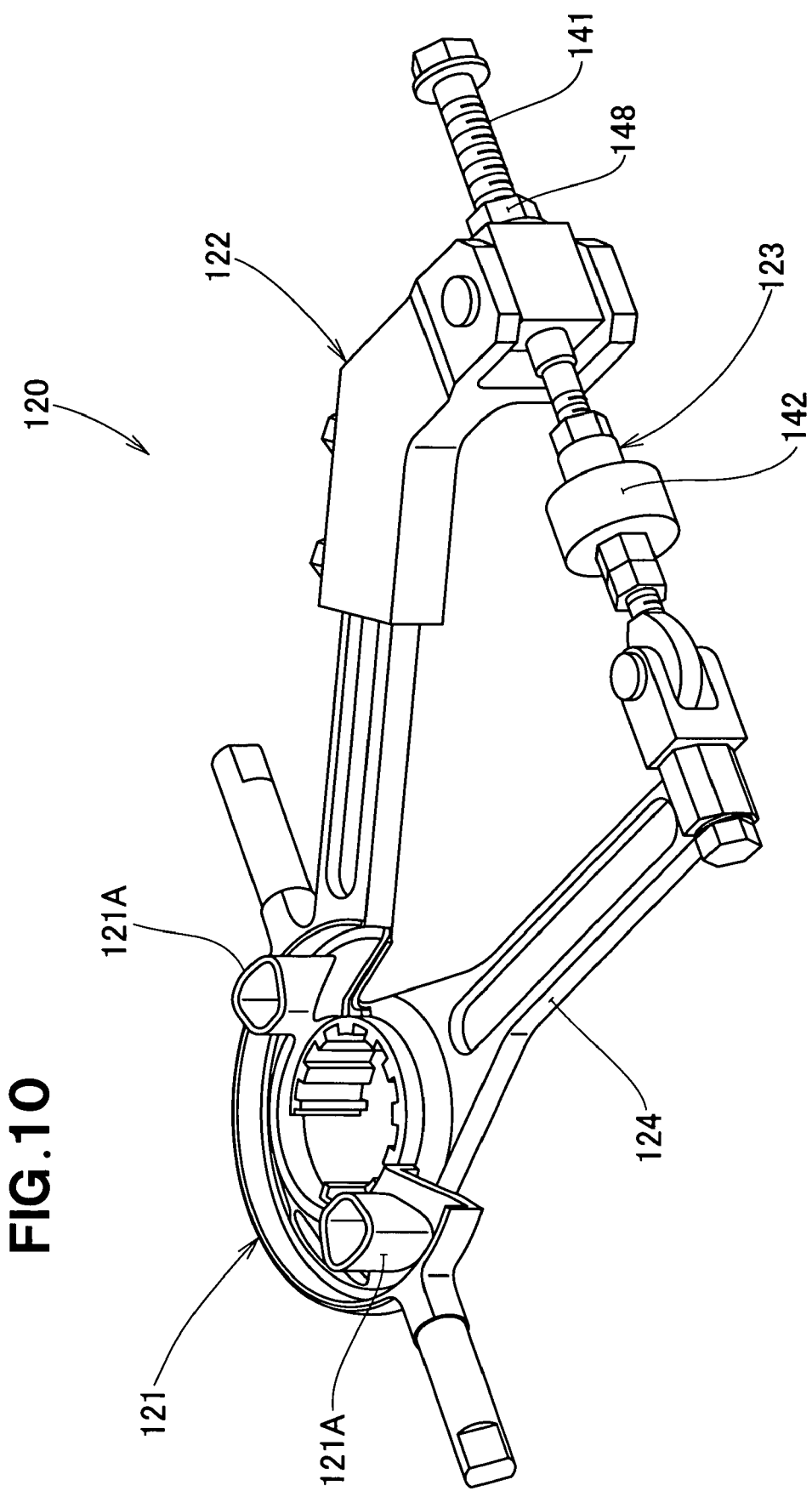
FIG. 10 is a perspective view of the tightening jig as viewed from a different angle from FIG. 9.

FIG. 10 shows the projections 121A formed on the piston holding portion 121 of the tightening jig 120 for fitting in the jig holding recesses 77A (see FIG. 5) formed on the rear surface of the piston 13 (see FIG. 9).

Description will now be made of the performance of the tightening jig 120.

Referring first to FIG. 3 again, the small end 66 of the connecting rod 16 and then the holder 68 are attached to the piston 13 and the fixing ring 71 is preliminarily tightened in the bottom of the piston 13, or more particularly its cup-shaped support 78 (see FIG. 4).

Figure 11:
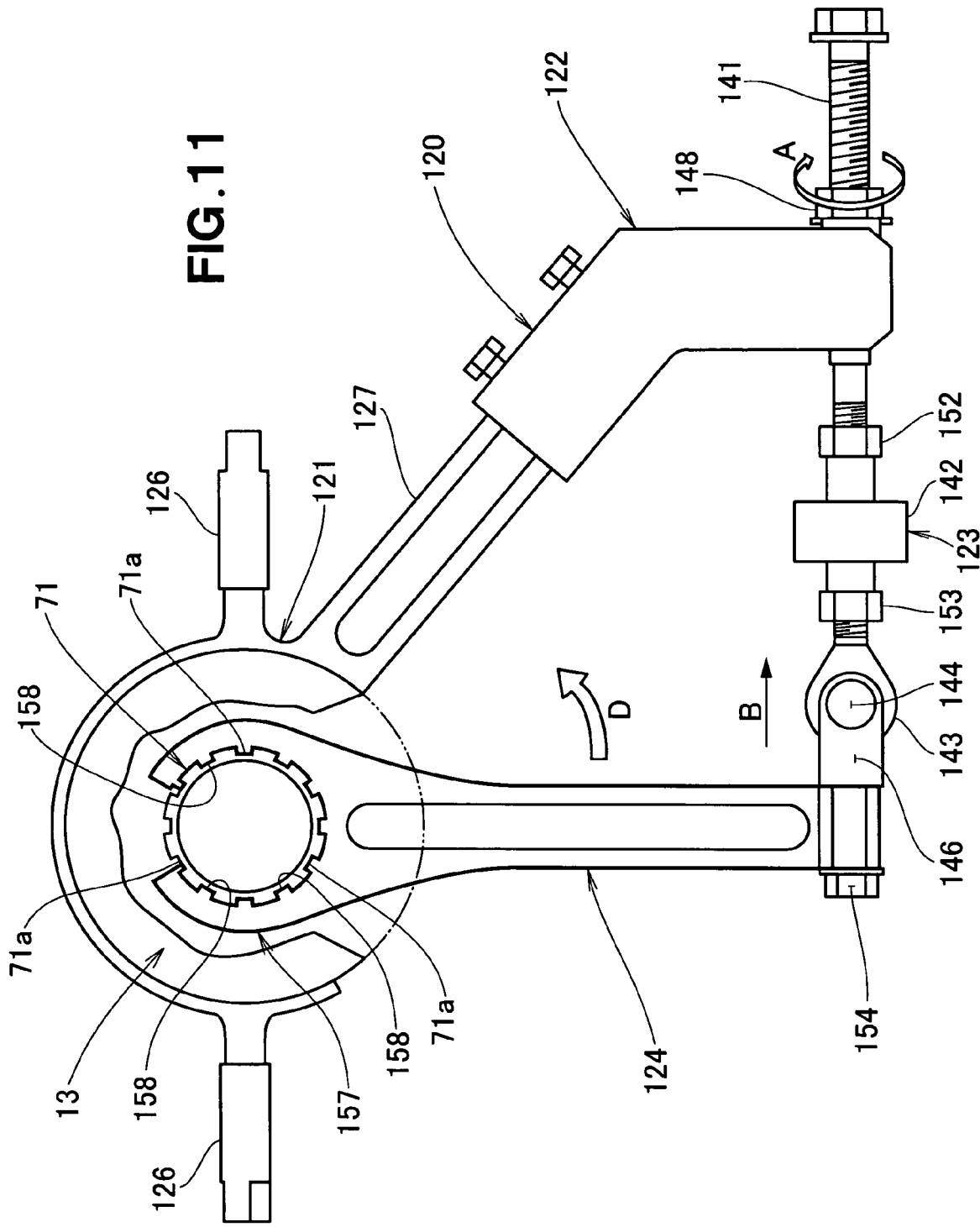
FIG. 11 is a top plan view of the tightening jig showing its operation.

Referring now to FIG. 11, the tightening jig 120 is secured to the piston 13 and a plurality of engaging pawls 158 formed in a C-shaped engaging portion 157 at the free end of the wrench portion 124 are engaged in the engaging recesses 71a of the fixing ring 71.

Then, the adjust nut 148 is turned about the first bolt 141 as shown by, for example, an outline arrow A. This causes the tightening force generating portion 123 as a whole to move axially as shown by an arrow B. As a result, the wrench portion 124 is rotated in the direction of an outline arrow D to turn the fixing ring 71 about the piston 13. Thus, the fixing ring 71 can be fully tightened by an adequate tightening torque.

Figure 12:
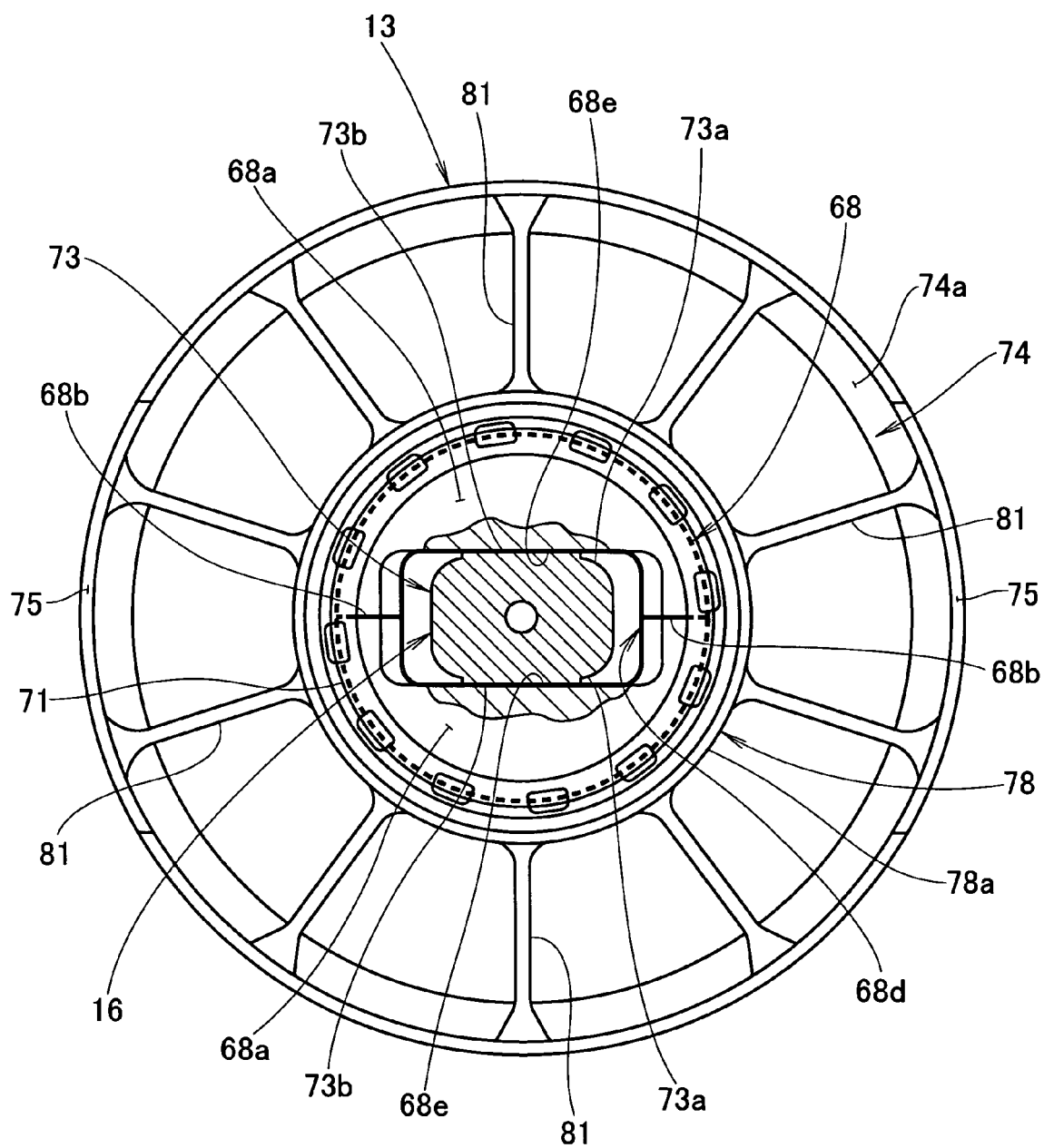
FIG. 12 is a bottom plan view, partly in section, of the piston and connecting rod according to this invention.

The connecting rod 16 has flat sliding surfaces 73b formed on its sides, or more specifically on opposite sides 73a of the base of its small end 66 (see FIG. 4) or of the rod portion 73 of its small end 66 in parallel to the swinging direction of the connecting rod 16 (horizontal as viewed in the drawing) as shown in FIG. 12. On the other hand, the holder 68 (which is shown by a thick line for a clearer showing of its shape) has guide surfaces 68e formed along opposite edges of a rectangular opening 68d formed therein to have the connecting rod 16 extend therethrough, and making sliding contact with the sliding surfaces 73b for guiding the rod portion 73 in its swinging motion. The land 74 has its inner surface shown at 74a and the cup-shaped support 78 has its outer surface shown at 78a.

The sliding surfaces 73b formed on the connecting rod 16 in parallel to its swinging direction and the guide surfaces 68e formed on the holder 68 for guiding the sliding surfaces 73b make it possible to prevent the rotation of the piston 13 about the connecting rod 16 and therefore about the axis of the cylinder.

Figure 13:
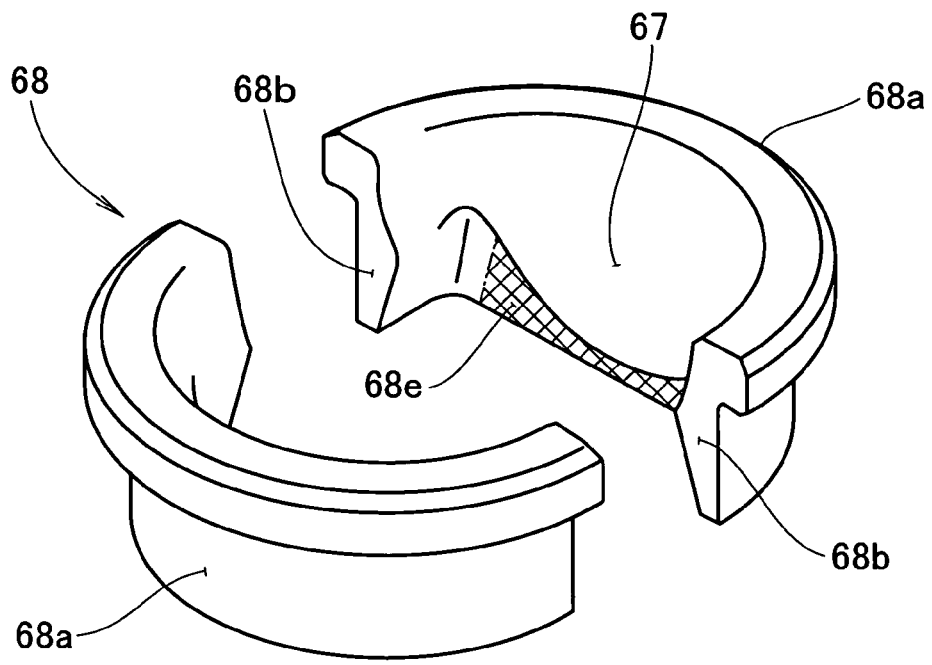
FIG. 13 is an exploded perspective view of the holder according to this invention.

FIG. 13 shows by cross hatching for better clarity one of the flat guide surfaces 68e formed on the holder halves 68a, respectively, of the holder 68.

Figure 14:
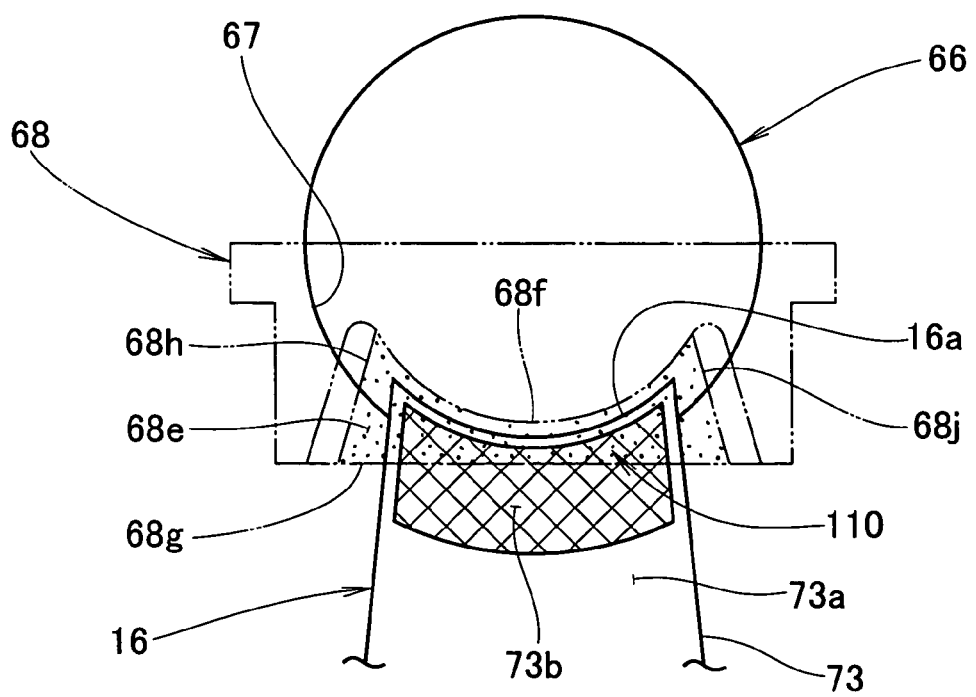
FIG. 14 is a side elevational view showing the relation between the connecting rod and holder according to this invention.

Referring to FIG. 14, each sliding surface 73b of the connecting rod 16 is a substantially arcuate area having one side extending along an arcuate boundary line 16a defined between the small end 66 and the side 73a of the rod body 73, as shown by cross hatching for better clarity. Each guide surface 68e of the holder 68 is an area having an arcuate side 68f defined by the edge of its spherical surface 67, a straight side 68g opposite the side 68f and a pair of slanting sides 68h and 68j, as shown by dots for better clarity. In FIG. 14, 110 denotes an area in which the guide surface 68e of the holder 68 and the sliding surface 73b of the connecting rod 16 overlap each other as viewed in side elevation, or an area of contact therebetween.

Description will now be made of the performance of the mechanism for preventing the rotation of the piston.

Figure 15A:
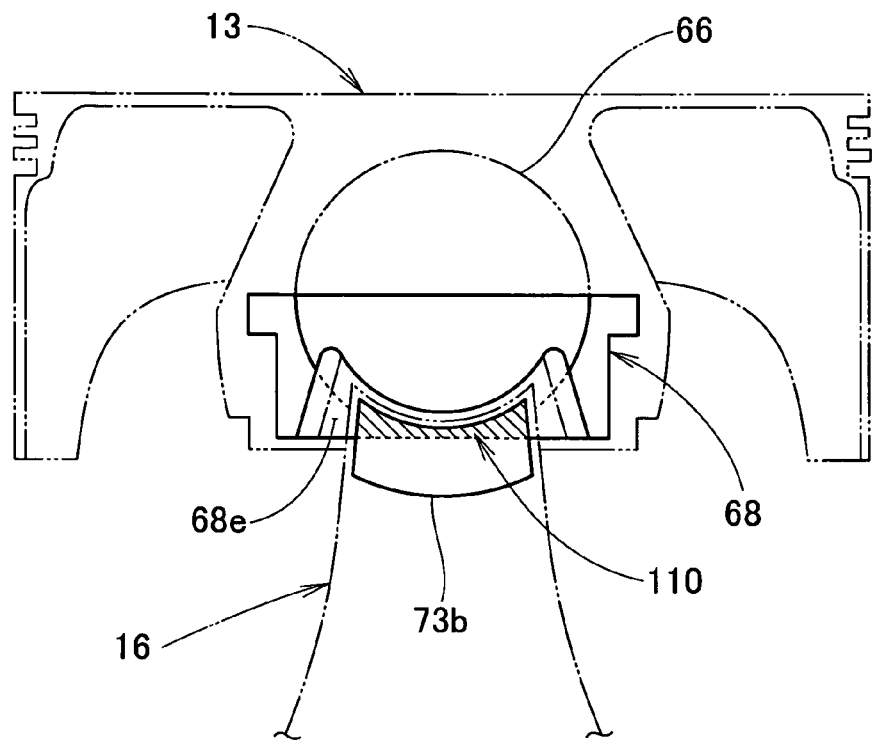
FIGS. 15A and 15B are schematic views explaining the performance of the device for preventing the rotation of the piston according to this invention.

FIG. 15A shows the connecting rod 16 not inclined to the axis of the cylinder, i.e. when the piston 13 stays at the top or bottom dead center of the cylinder. The overlapping area 110 between the guide surface 68e of the holder 68 and the sliding surface 73b of the connecting rod 16 is shown by hatching.

Figure 15B:
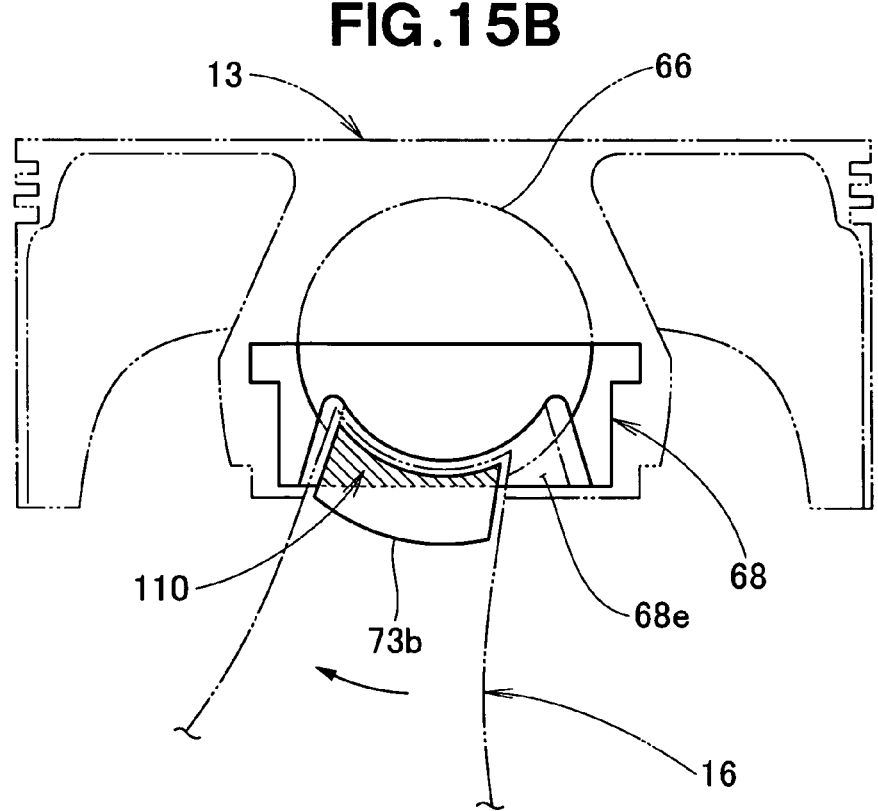

FIG. 15B shows the connecting rod 16 inclined as a result of, for example, the movement of the piston 13 from the top to bottom dead center of the cylinder. The sliding surface 73b of the connecting rod 16 swings as shown by an arrow in sliding contact with the guide surface 68e of the holder 68 to have the holder 68 hold the piston 13 against rotation. Thus, the sliding surfaces 73b of the connecting rod 16 as guided by the guide surfaces 68e of the holder 68 make it possible to prevent the rotation of the piston 13 about the axis of the cylinder.

Figure 16:
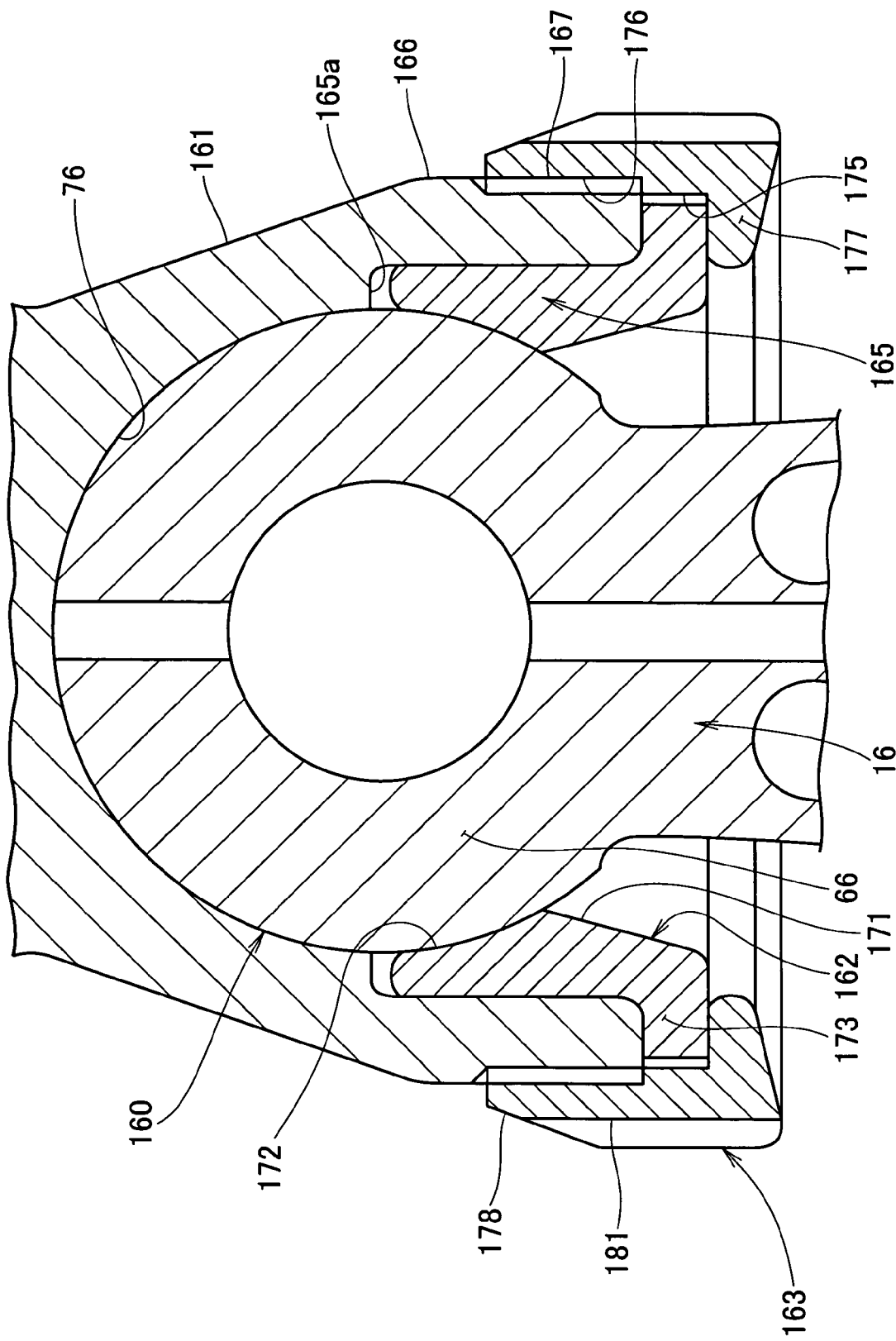
FIG. 16 is an enlarged sectional view showing a joint structure for a piston and a connecting rod according to another embodiment of this invention.
Figure 17:
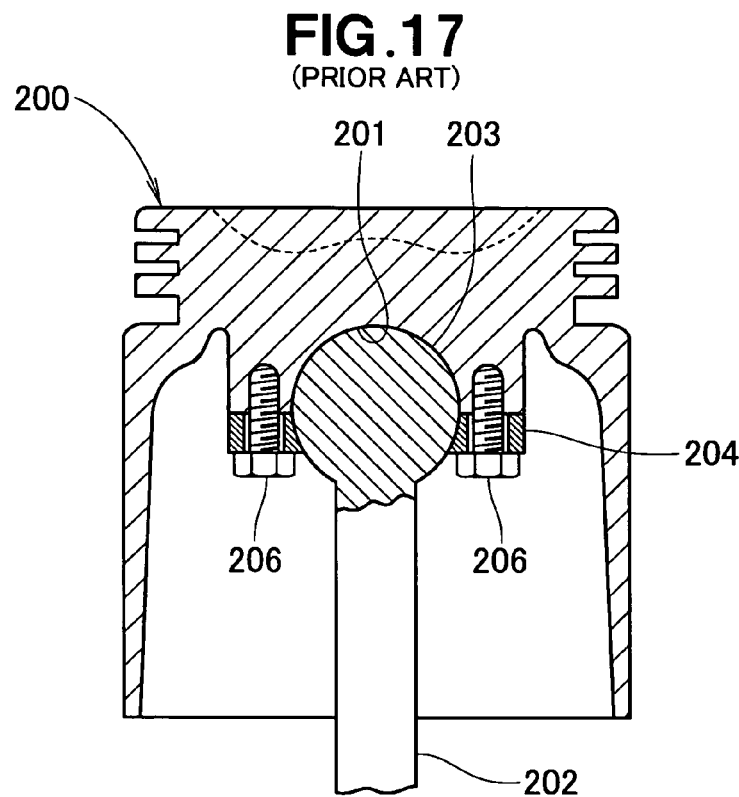
FIG. 17 is a sectional view showing a known coupling structure for a piston and a connecting rod including flanges for holding them together.
Figure 18:
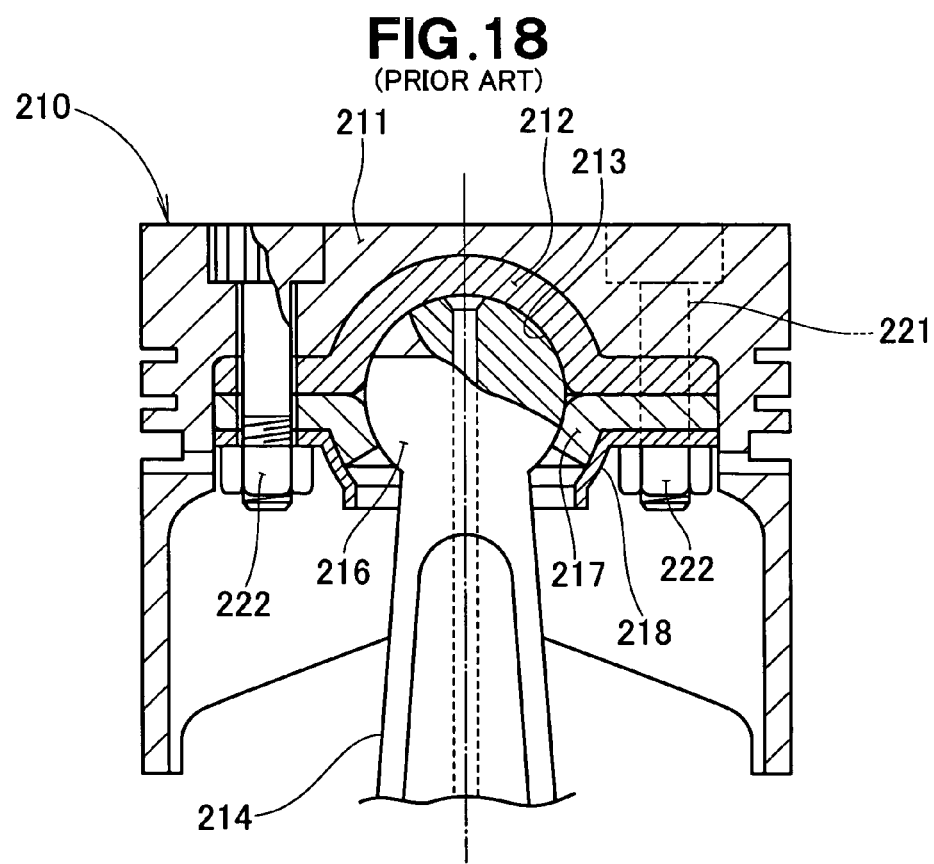
FIG. 18 is a sectional view showing another known coupling structure for a piston and a connecting rod including a retainer for holding them together.
Figure 19A:
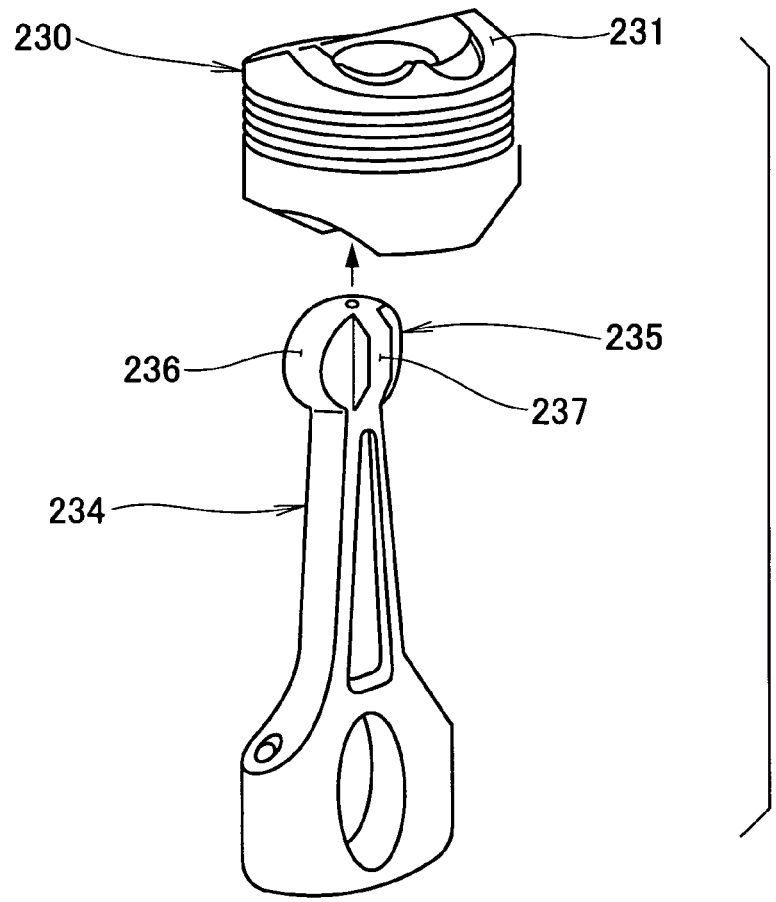
FIG. 19A is an exploded perspective view showing still another known coupling structure for a piston and a connecting rod.
Figure 19B:
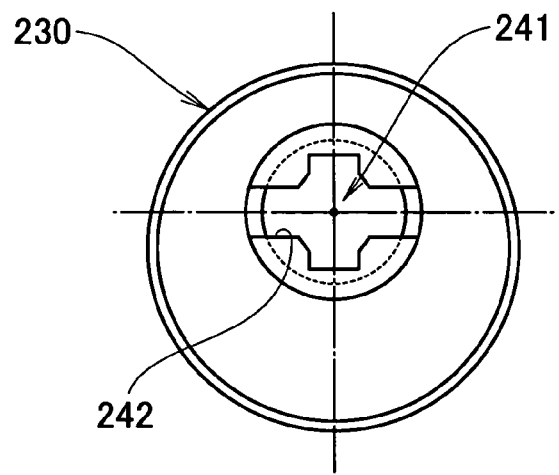
FIG. 19B is a bottom plan view showing the rear surface of the crown of the piston.
Figure 20:
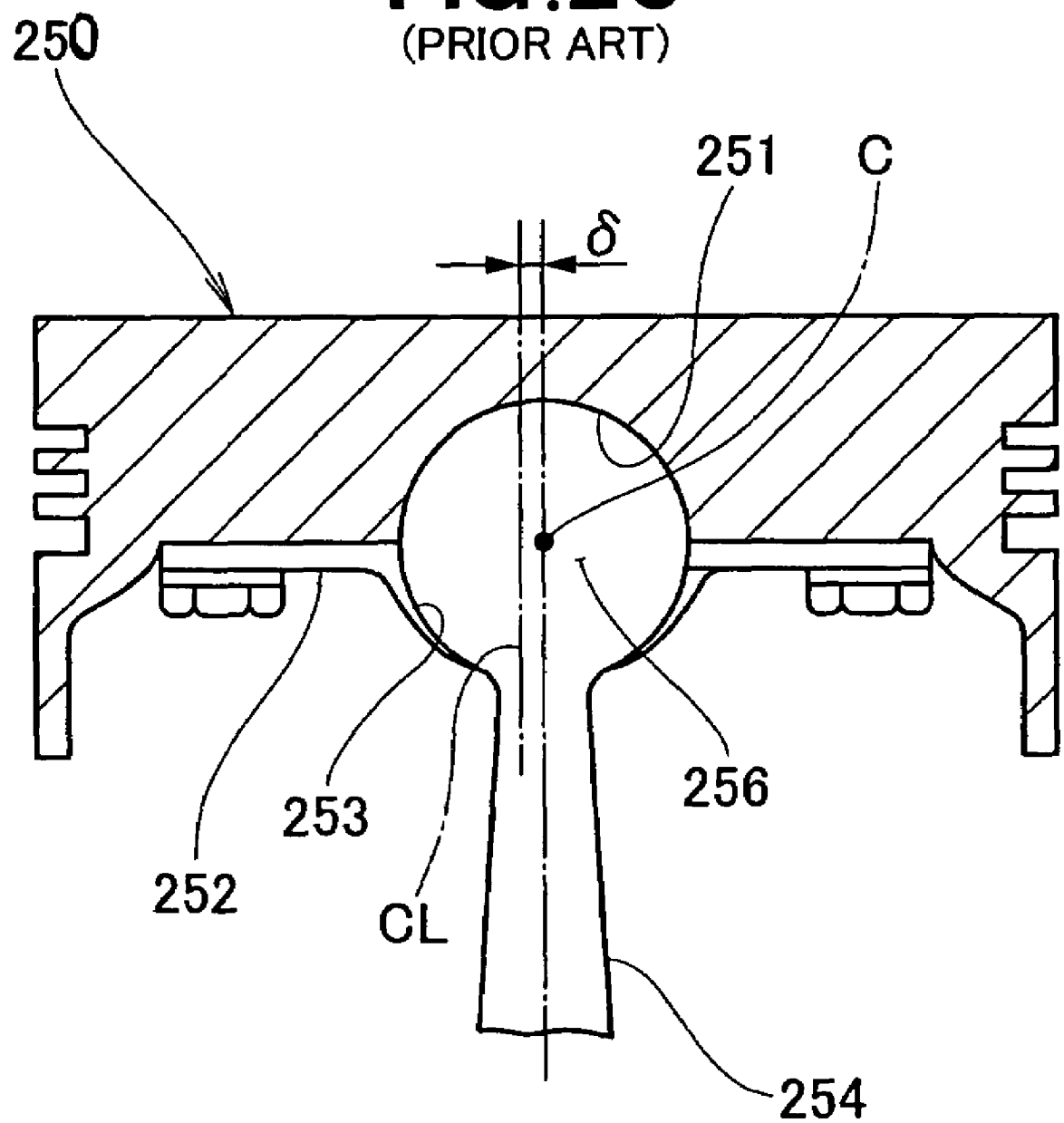
FIG. 20 is a sectional view showing still another known coupling structure for a piston and a connecting rod including a fixing plate for holding them together.

FIG. 16 is a sectional view showing a joint structure according to another embodiment of this invention. A spherical joint 160 forming the joint structure has a cup-shaped support 161 protruding from the crown of a piston, a spherical small end 66 of a connecting rod 16 fitted slidably in a semi-spherical concavity 76 formed in the cup-shaped support 161, a holder 162 holding the small end 66 and a threaded fixing ring 163 securing the holder 162 to the cup-shaped support 161, as shown in FIG. 16.

The cup-shaped support 161 has a downwardly opening concavity 165 formed inwardly of its lower end and a male thread 167 formed on its outer peripheral surface 166 adjacent to its lower end. A semi-spherical concavity 76 as described before is formed in the bottom 165a of the downward concavity 165. The outer peripheral surface 166 having the male thread 167 defines a threaded portion of the cup-shaped support (protrusion) 161.

The holder 162 has a spherical inner surface 171 holding the small end 66 and a flange 173 formed at one end (or its lower end as shown) and contacting the end of the cup-shaped support 161.

The fixing ring 163 has a female thread 176 formed on its inner surface 175 and engaging with the male thread 167 of the cup-shaped support 161, a flange 177 formed at its end (or its lower end as shown) and holding the flange 173 of the holder 162 against the end of the cup-shaped support 161 and a plurality of engaging recesses 181 formed in its outer surface 178 for turning the fixing ring 163. The inner surface 175 having the female thread 176 defines a threaded portion of the fixing ring 163.

The fixing ring 163 having the female thread 176 formed on its inner surface 175 and the engaging recesses 181 formed in its outer surface 178 as described can be turned easily by a tool engaged in its engaging recesses 181 to achieve an improved efficiency in a fixing job. Moreover, the engaging recesses 181 can be formed in the outer surface 178 of the fixing ring 163 easily to improve its workability.

In this embodiment in which the male thread 95 of the fixing ring 71 is engaged with the female thread 94 of the cup-shaped support 78 as shown in FIG. 6, it is possible to hold the fixing ring 71 against rotation by welding it to the cup-shaped support 78, or bending it over the cup-shaped support 78, or inserting a lock pin through the fixing ring 71 and the cup-shaped support 78 after tightening the fixing ring 71 fully. Although FIG. 14 shows the sliding surface 73b of the connecting rod 16 as being substantially arcuate in shape, it may alternatively be rectangular, V-shaped or inverted triangular.

Obviously, various minor changes and modifications of the present invention are possible in the light of the above teaching. It is therefore to be understood that within the scope of the appended claims the invention may be practiced otherwise than as specifically described.

What is claimed is:

1. A coupling structure for coupling a piston and a connecting rod, comprising:
a protrusion formed on a rear surface of a crown of the piston and having a downwardly opening concavity and a semi-spherical concavity formed in a bottom of the downwardly opening concavity, said downwardly opening concavity having a cylindrical inner surface extending from the bottom to an open end of the downwardly opening concavity in concentric relation to the semi-spherical concavity, and a threaded portion formed on the cylindrical inner surface and having a female thread extending from the open end toward the bottom of the downwardly opening concavity;
a substantially spherical small end formed at one end of the connecting rod;
a holder having a spherical inner surface and holding the substantially spherical small end of the connecting rod slidably in a substantially spherical space defined by its inner surface and the semi-spherical concavity of the protrusion; and
a fixing ring having a cylindrical outer surface including a threaded portion formed thereon and having a male thread engaging with the threaded portion of the protrusion for securing the holder to the protrusion of the piston,
wherein first and second clearances are formed respectively between the cylindrical inner surface of the protrusion and an adjacent first outer surface of the holder and between an inner surface of the fixing ring and an adjacent second outer surface of the holder so that the holder is in abutment with the bottom of the downwardly opening concavity.

2. The coupling structure according to claim 1, further comprising a sliding surface formed near a base of the spherical small end of the connecting rod in parallel to a swinging direction of the connecting rod and a guide surface formed on the holder in sliding contact with the sliding surface of the connecting rod for guiding its swinging motion, the sliding and guide surfaces defining means for preventing rotation of the piston about the connecting rod and thereby the longitudinal axis of a cylinder.

3. The coupling structure according to claim 1, wherein the fixing ring has a plurality of engaging recesses formed in the outer surface thereof for engagement with a tool to turn the fixing ring.

4. The coupling structure according to claim 3, wherein the tool comprises a tightening jig including a piston holding portion for holding the piston in position, a supporting portion supporting the piston holding portion slidably, a tightening force generating portion having one end connected with the supporting portion for generating a tightening force for tightening the fixing ring, and an arm-shaped wrench portion connected to another end of the tightening force generating portion for placement around the fixing ring, the wrench portion having a C-shaped engagement portion at a distal end thereof and a plurality of engaging pawls for interdigitating engagement with the engagement recesses of the fixing ring.

5. The coupling structure according to claim 3, further comprising a sliding surface formed near a base of the spherical small end of the connecting rod in parallel to a swinging direction of the connecting rod and a guide surface formed on the holder in sliding contact with the sliding surface of the connecting rod for guiding its swinging motion, the sliding and guide surfaces defining means for preventing rotation of the piston about the connecting rod and thereby the longitudinal axis of a cylinder.

6. A coupling structure for coupling a piston and a connecting rod, comprising:
 a protrusion formed on a rear surface of a crown of the piston and having a semi-spherical concavity and a threaded portion concentric to the concavity;
 a substantially spherical small end formed at one end of the connecting rod;
 a holder having a spherical inner surface and holding the substantially spherical small end of the connecting rod slidably in a substantially spherical space defined by its inner surface and the semi-spherical concavity of the protrusiom; and
 a fixing ring having a threaded portion engaging with the threaded portion of the protrusion for securing the holder to the protrusion of the piston, wherein the threaded portion of the protrusion is defined by a cylindrical outer surface thereof having a male thread, while the threaded portion of the fixing ring is defined by a cylindrical inner surface thereof having a female thread.

7. The coupling structure according to claim 6, further comprising a sliding surface formed near a base of the spherical small end of the connecting rod in parallel to a swinging direction of the connecting rod and a guide surface formed on the holder in sliding contact with the sliding surface of the connecting rod for guiding its swinging motion, the sliding and guide surfaces defining means for preventing rotation of the piston about the connecting rod and thereby the longitudinal axis of a cylinder.

8. The coupling structure according to claim 6, wherein the fixing ring has a plurality of engaging recesses formed in the outer surface thereof for engagement with a tool to turn the fixing ring.

9. The coupling structure according to claim 8, wherein the tool comprises a tightening jig including a piston holding portion for holding the piston in position, a supporting portion supporting the piston holding portion slidably, a tightening force generating portion having one end connected with the supporting portion for generating a tightening force for tightening the fixing ring, and an arm-shaped wrench portion connected to another end of the tightening force generating portion for placement around the fixing ring, the wrench portion having a C-shaped engagement portion at a distal end thereof and a plurality of engaging pawls for interdigitating engagement with the engagement recesses of the fixing ring.

10. The coupling structure according to claim 8, further comprising a sliding surface formed near a base of the spherical small end of the connecting rod in parallel to a swinging direction of the connecting rod and a guide surface formed on the holder in sliding contact with the sliding surface of the connecting rod for guiding its swinging motion, the sliding and guide surfaces defining means for preventing rotation of the piston about the connecting rod and thereby the longitudinal axis of a cylinder.

* * * * *